3,262,755
IRON OXIDE PIGMENTS
Andre Steinmetz, Aubervilliers, Roger Botton, Paris, and Jean Paul Delgrange, Le Vesinet, France, assignors to Compagnie de Saint-Gobain, Neuilly-sur-Seine, France
No Drawing. Filed Nov. 13, 1962, Ser. No. 237,311
Claims priority, application France, Nov. 30, 1961, 880,445
3 Claims. (Cl. 23—200)

This invention relates to a method of preparing iron oxide pigments by a wet process which eliminates the need for calcination.

There are different, known processes for preparing iron oxide pigments of red tones. One of these methods involves the formation of seeds of red oxide of iron by the addition of an alkali, or by the addition of a salt having an alkaline reaction to an aqueous solution of ferrous sulfate in the presence of an oxidizing agent. The enlargement and development of these seeds of iron oxide is proceeded with in the presence of metallic iron, with agitation, and at suitable conditions of temperature and oxidation. Nevertheless, the reaction which produces the seeds of iron oxide requires delicate manipulation and, even when the reaction conditions have been exactly established, it is difficult to reproduce the results of a manufacture as the process produces pigments ranging in hue from red to brown-red, which still contain a relatively large quantity of water of hydration, for instance from 2 to 8%, which is undesirable.

It is an object of this invention to produce novel pigments of this type by a process which is capable of repetition to yield any desired hue.

In another prior art process, for instance that described in French Patent No. 849,176, the forming bath contains anhydrous red oxide seeds which are prepared by the calcination of yellow oxide of iron at temperatures between 300° and 600° C. The seeds develop into pigments in aqueous medium by immersion in a bath of ferrous sulfate in the presence of metallic iron and an oxidizing agent.

This process requires a calcination of the product used to form the pigments and two washings, one of the yellow oxide and the other of the pigment. This process has the additional disadvantage that it is less easy to prepare red pigments of clear tones.

It is another object of the invention to prepare red oxide pigments without calcination and with a minimum of washing, as the washing requires equipment, manipulation, and time.

Another object is to prepare red pigments in which the tones may be made to vary from bright red to violet, as desired, in which the process can be made to produce duplicates of any desired shade. Another object is to prepare these pigments in aqueous medium without calcination and without drying except that which is applied to the final product. Another object is to impart flexibility to the process whereby to control the qualities of the pigment in a manner which is superior to that which was capable of accomplishment by prior art methods.

Another object is to prepare iron oxide pigments of hues which were previously difficult to prepare and an intermediate, the seeds, of superior properties.

The objects of the invention have been accomplished, generally speaking, by a method of preparing seed intermediates of red oxide type which comprises forming the seeds in solution by classical methods, neutralizing the solution preferably to slight acidity, and maturing the seeds, above formation temperature and below boiling, in the mother liquor for a minimum of about 8 hours. The pigments which are produced by the process are of novel color and superior properties. The mother liquor containing the seeds of superior properties is also novel.

In carrying out the invention, after the seeds of red oxide have been prepared by the action of an alkali, or a salt of alkaline reaction, on ferrous sulfate in the presence of an oxidizing agent, and before the manufacture of the final pigment by the development of these seeds in the presence of air and metallic iron, the seeds are subjected to a novel step of maturing which involves allowing them to rest in the agitated mother liquor at a temperature above that of their formation, preferably around 75° C., and usually not below 50 or above 80° C. for about 8 to 48 hours. The duration of this maturing of the seeds changes the hue of the pigment and its duration may be used for color control. The duration also has some relation to the volumes of the solutions which are being employed.

Accordingly another characteristic of this process involves the use of a mother liquor containing a metallic chloride, preferably a chloride of an alkali metal, which may satisfactorily be sodium chloride, in the stage of forming the seeds, or in the preparation of the pigment from the seeds, or in both stages. This step has the advantages of permitting the production of red seeds, the color of which is readily reproducible and which can subsequently be easily transformed into pigments of which the color can be varied from clear red to violet, including all the intermediate tones.

The following examples are illustrative of the invention but do not derogate from the generalities of what has elsewhere been herein stated.

The first example states a process which is generally useful and which is readily controlled to produce the desired pigments in a reproducible manner.

*Example 1*

A water bath is prepared at a temperature from about 30 to 60° C. into which one places metallic iron, for example as turnings, ribbons, filings, and continuous agitation is applied to the bath. Air is bubbled through the bath and a chloride of an alkaline metal (in this case NaCl) is introduced at about 3 to 10 grams per litre. A strong mineral acid is added, for instance sulfuric or hydrochloric, forming the ferrous salt in situ, a concentration of 5 to 11 grams of pure acid per litre being satisfactory. The reactants are left in contact for a few minutes, then a stronger oxidizing agent, such as $H_2O_2$ or a hypochlorite, is added. The reactions are allowed to produce again for several minutes and the medium is substantially neutralized by the addition of an alkali, such as sodium carbonate, so as to produce a somewhat acid mother liquor of approximately 5.5–6 pH. This preliminary phase being ended, the maturing stage is undertaken.

During the maturing, the mother liquor containing the red oxide seeds is carried to a temperature, for example 75° C., with agitation and the continued introduction of air. This maturing stage may be of a very variable duration depending upon the results which are to be obtained, but generally extends from about 8 to 48 hours. This maturing step is necessary to the production of red pigments, because if it be omitted, only yellow or orange-yellow pigments can be obtained.

After these seeds have been subjected to this prolonged maturing at an elevated temperature, the manufacture, properly so-called, of the pigment is begun by introducing, into the suspension containing the seeds, a ferrous salt, for instance ferrous sulfate, at a ratio of 20 to 55 grams per litre, while continuing the agitation and insufflation by air, the temperature being maintained at 75° C. This third phase of the process produces the pigment and is continued until the pigment is of the desired color; the longer this operation is continued the deeper becomes the tones of the pigment, eventually producing red-violet or violet hues.

When the desired tone has been obtained, the pigments are filtered and washed until no salts are found in the effluents. The products are then dried at a temperature on the order of 110 to 115° C. or more.

Another characteristic of the process is that in drying at a temperature above 125 or 130° C., for example 150° C., one obtains pigments which are increasingly anhydrous and which have a tone which is deeper and more uniform than that of the same products which are dried only at 110 to 115° C.

In a variation of the foregoing process, the metallic iron may be withheld from the bath until after the neutralization by alkali carbonate, but in this case one replaces the metallic iron and acid used in the initial stage of the process by ferrous salts, for example ferrous sulfate, in equivalent amount. This variant has the advantage of reducing the time of reaction of iron on acid (about 10 minutes at 30° C.).

The quantity of seeds used in the step of fabricating the pigment has an effect on the rate of production and on the quality of the product. For instance, doubling the concentration of the seeds per volume of the bath increases the production, and yields a clearer pigment. It is generally useful, therefore, to employ higher rather than lower concentration of seeds.

In the process as above described, the ferrous salt is oxidized in situ to the ferric state by energetic oxidation aided by a strong oxidizing agent such as hydrogen peroxide, but in a modification of the process the oxidation in situ is replaced by the direct introduction of the ferric salt, for instance ferric chloride.

Example 2

A 2 litre flask is provided with mechanical agitation and with an inlet tube through which air can be made to bubble through the solution in the flask. Into the flask are placed 118 grams of metallic iron and 1450 cc. of water. The flask is heated to 30° C. and air is bubbled through the mixture at 15–18 l./h. To the flask are added 14 grams of NaCl and 14 cc. of 1200 g./l. $H_2SO_4$. Agitation is continuous. After 10 minutes there is introduced 8 cc. of $H_2O_2$ at 21% by weight. After 5 minutes of reaction 17 grams of anhydrous $Na_2CO_3$ dissolved in 50 cc. $H_2O$ are added to neutralize the free acidity. At this point the seeds have been formed in the mother liquor.

The mother liquor is now heated to about 75° C., the air flow and agitation continuing, and the seeds are matured for 17 hours, producing the starting bath from which the pigment can be made.

To the bath thus formed, the conditions of air flow, agitation and heating continuing, is added 50 grams of $FeSO_4 \cdot 7H_2O$. After 7 hours the operation is ended, the product is filtered, washed free of sulfate ions, and dried at 110–115° C., yielding a dark red pigment which absorbs linseed oil (Afnor NFT 30–022 test) at level 35 and contains 65.5% iron.

Example 3

An 8 l. flask, provided as in Example 2, receives 480 g. iron and 5,750 cc. $H_2O$, is heated to 30° C., receives 80–90 l./h. of air and 15 g. NaCl. To this mixture is added 15 cc. of $H_2SO_4$ containing 1200 g./l. Agitation and air input are continuous. After 10 minutes, 10 cc. of $H_2O_2$ at 21% by weight are added. After a new reaction period of 5 minutes, 19 g. of $Na_2CO_3$ in 50 cc. of $H_2O$ are added.

The temperature of the mother liquor is now raised to 75°. At the end of 21 hours of aging with continued air and agitation, the clear red starting bath is ready for the production of pigment.

To the forming bath are added 180 g. $FeSO_4 \cdot 7H_2O$ and the process proceeds as in Example 2. After 23 hours the process is ended, the pigment is filtered and washed free of $SO_4$ ions and dried at 110–115° C., yielding 123 g. of dark red pigment having linseed oil absorption of 34 and iron content of 65.8%.

Example 4

A flask of 220 l. provided as in Example 1 receives 12 kg. of iron, in plates 1 mm. thick, and 180 l. $H_2O$. The mass is heated at 30° C., air is forced through it, and 1.5 kg. NaCl and 1600 cc. of $H_2SO_4$ containing 1180 g./l. (1888 g. $H_2SO_4$) are added. After 10 minutes, 1 litre of $H_2O_2$ at 21% by weight is added. After 5 minutes, 1970 g. anhydrous $Na_2CO_3$ in 8 l. $H_2O$ are added, bringing the solution to approximate neutrality, (6.3), and the volume is adjusted to 200 l. Air flow is set at 2 cu. m./h. and the temperature is raised to 75° C. for the maturing step.

After 46 hours, the fabricating bath of clear red is ready, and 5 kg. of $FeSO_4 \cdot 7H_2O$ are added, agitation and oxidation continuing for 8 hours. The pigment is then filtered, washed free of $SO_4$ ions, and dried at 110–115° C. The yield is 2300 g. of a dark red pigment having linseed oil absorption of 41 and iron content of 66.3%.

Example 5

The product of Example 4, after filtration and washing, was dried at 150° C. in lieu of 110–115° C. The pigment was of deeper color, had oil absorption of 39 and 67.25% iron.

Example 6

A 2 l. flask, provided as in Example 1, received 1450 cc. of $H_2O$, 12 g. NaCl, 9 cc. $H_2SO_4$ of 1200 g./l. concentration, and 16.7 g. ferrous sulfate. After 10 minutes of agitation and insufflation at 30° C., 8 cc. of $H_2O_2$ at 21% by weight were added as aforesaid. After 5 minutes, 17 g. $Na_2CO_3$ in 50 cc. $H_2O$ were added and 120 g. Fe. The temperature was raised to 75° C. for 8 hours, producing a clear red pigment forming solution to which was added 60 g. $FeSO_4$. The agitation and insufflation continued 22 hours. The pigment was filtered out, washed $SO_4$ ion free, dried at 110–115° C., and tested. It absorbed linseed oil at level 45 and contained 64.5% iron.

Example 7

The flask of Example 5 received 120 g. metallic iron and 1450 cc. $H_2O$ at 30° C. Air was bubbled through at 15–18 litres per hour and 5 g. NaCl and 11.2 cc. of a 28% solution of ferric chloride ($d=1.26$, viz. 3.95 g. $FeCl_3$) were added. Neutralization was by 5 g. anhydrous $Na_2CO_3$ in 50 cc. $H_2O$. After 24 hours of maturing at 75° C. the fabricating bath of clear red was ready. To it were added 60 g. $FeSO_4$, agitation and insufflation continuing, and the formation continued for 24 hours. The bath was filtered and the pigment was washed as aforesaid. It was medium red, had oil absorption of 39 and 66.7% iron.

Among the advantages of the invention are the production of new pigments by a new and superior process which is capable of perfect reproduction of its products. It proceeds in aqueous medium. It requires no calcination and only one wash. It produces a wider range of colors than any previous process at a higher rate. The tones run from clear red to dark violet. The pigments formed by the new process have about 1% water of hydration and frequently less, which is materially better than the prior art, and this is accomplished in water bath and without calcination. The method is flexible and its results are reproducible, permitting the exact duplication of a shade from different baths. The maturing step produces a superior seed in a superior pigment fabricating bath.

As many apparently widely different embodiments of the present invention may be made without departing from the spirit and scope thereof, it is to be understood that the invention is not limited to the specific embodiments.

What is claimed is:
1. In the process for making red iron oxide pigments substantially free of combined water without calcination which includes a first step of reacting metallic iron and acid in the presence of an alkali metal salt and gaseous oxygen in aqueous medium, thereby forming red iron oxide in situ, the novel steps of maturing the newly formed red iron oxide by adding to the medium containing it a stronger oxidizing agent than oxygen, which is of the type of $H_2O_2$ and the hypochlorites, neutralizing the medium to a pH of about 5.5 to 6, and heating the medium to about 50 to 80° C. with the continued introduction of gaseous oxygen for about 8 to 48 hours.

2. In the process for making red iron oxide pigments substantially free of combined water without calcination which includes a first step of insufflating an aqueous solution of an iron salt of a strong mineral acid containing an alkali metal salt and metallic iron with gaseous oxygen, adding a ferrous salt while continuing the insufflation with gaseous oxygen until the pigment has the desired shade, and isolating and washing the pigment, the novel maturing steps which comprise adding a stronger oxidizing agent than oxygen, which is of the type of $H_2O_2$ and the hypochlorites, to the aqueous medium, neutralizing the medium to about pH 5.5 to 6 and raising the temperature of the medium to about 50 to 80° C. for about 8 hours.

3. In the process for making red iron oxide pigments substantially free of combined water without calcination which includes a first step of preparing red iron oxide pigment seeds from an aqueous medium containing ferrous sulfate, introducing a ferrous salt to the aqueous medium containing the seeds, and continuing the introduction of gaseous oxygen and the heating until the desired shade and quality of pigment is produced, the novel steps of adding a stronger oxidizing agent than oxygen, which is of the type of $H_2O_2$ and the hypochlorites to the medium containing the seeds, neutralizing the medium to a pH of about 5.5 to 6 and maturing the seeds thus produced by heating the medium containing the seeds to about 50 to 80° C. with continued introduction of gaseous oxygen.

References Cited by the Examiner

UNITED STATES PATENTS

| | | | |
|---|---|---|---|
| 2,633,407 | 3/1953 | Marsh | 23—200 |
| 2,694,656 | 11/1954 | Camras | 23—200 X |
| 2,716,595 | 8/1955 | Marsh | 23—200 |
| 2,937,927 | 5/1960 | Ayers et al. | 23—200 |

FOREIGN PATENTS

| | | |
|---|---|---|
| 643,303 | 9/1950 | Great Britain. |
| 830,108 | 3/1960 | Great Britain. |

OSCAR R. VERTIZ, *Primary Examiner.*

MAURICE A. BRINDISI, *Examiner.*

E. C. THOMAS, J. J. BROWN, *Assistant Examiners.*